United States Patent
Mudie et al.

(10) Patent No.: US 10,650,315 B2
(45) Date of Patent: May 12, 2020

(54) AUTOMATIC SEGMENTATION OF DATA DERIVED FROM LEARNED FEATURES OF A PREDICTIVE STATISTICAL MODEL

(71) Applicant: International Business Machines Corporation, Armonk, NY (US)

(72) Inventors: Michael C. Mudie, Salem, MA (US); Christopher A. Bischke, Lowell, MA (US); Abhijit Tomar, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 125 days.

(21) Appl. No.: 16/008,226

(22) Filed: Jun. 14, 2018

(65) Prior Publication Data
US 2019/0385075 A1  Dec. 19, 2019

(51) Int. Cl.
*G06N 7/00* (2006.01)
*G06K 9/62* (2006.01)
(Continued)

(52) U.S. Cl.
CPC .............. *G06N 7/00* (2013.01); *G06K 9/6215* (2013.01); *G06K 9/6267* (2013.01); *G06N 3/04* (2013.01);
(Continued)

(58) Field of Classification Search
CPC .......... G06N 7/00; G06N 20/00; G06N 5/046; G06N 3/04; G06T 5/005; G06K 9/6215; G06K 9/6267
See application file for complete search history.

(56) References Cited

U.S. PATENT DOCUMENTS

| | | |
|---|---|---|
| 9,799,102 B2 | 10/2017 | Carr et al. |
| 2018/0028079 A1 | 2/2018 | Gurevich et al. |
| 2018/0144243 A1 | 5/2018 | Hsieh et al. |

OTHER PUBLICATIONS

Neff, T., Payer, C., Štern, D., & Urschler, M. (May 2018). Generative Adversarial Networks to Synthetically Augment Data for Deep Learning based Image Segmentation. In Proceedings of the OAGM Workshop 2018: Medical Image Analysis. Verlag der Technischen Universität Graz. (Year: 2018).*

(Continued)

*Primary Examiner* — Menatoallah Youssef
(74) *Attorney, Agent, or Firm* — Stephen R. Tkacs; Stephen J. Walder, Jr.; William J. Stock (57) ABSTRACT

A mechanism is provided in a data processing system comprising a processor and a memory, the memory comprising instructions executed by the processor to specifically configure the processor to implement a statistical model tool for providing insight into decision making. The statistical model tool applies the statistical model to an input image to generate an original classification probability. An image modification component executing within the statistical model tool iterative modifies each portion of the input image to generate a modified image. The statistical model tool applies the statistical model to the modified image to generate a new classification probability for each portion of the input image. A compare component executing in the statistical model tool compares each new classification probability to the original classification probability to generate a respective probability distance. A distance map generator executing within the statistical model tool generates a distance map data structure based on the probability distances. The distance map data structure represents an impact each portion of the input image has on determining classification probability by the statistical model.

20 Claims, 3 Drawing Sheets

(51) Int. Cl.
G06N 3/04 (2006.01)
G06N 5/04 (2006.01)
G06T 5/00 (2006.01)
G06N 20/00 (2019.01)

(52) U.S. Cl.
CPC ............. *G06N 5/046* (2013.01); *G06N 20/00* (2019.01); *G06T 5/005* (2013.01)

(56) References Cited

OTHER PUBLICATIONS

Luc, P., Couprie, C., Chintala, S., & Verbeek, J. (2016). Semantic segmentation using adversarial networks. arXiv preprint arXiv: 1611.08408. (Year: 2016).*

List of Patents or Patent Applications Treated as Related, Dec. 10, 2018, 2 pages.

Belkhouche, Yassine et al., "Decision-level Fusion of Multi-modal Data using Manifolds", IPCV'17—The 21th Int'l Conference on Image Processing, Computer Vision, & Pattern Recognition, May 11, 2017, 5 pages.

Christie, Gordon et al., "Fast inspection for size-based analysis in aggregate processing", Machine Vision and Applications 26.1, Oct. 2014, 10 pages.

Ho, Seng-Beng et al., "Shape Smoothing Using Medial Axis Properties", IEEE Transactions on Pattern Analysis and Machine Intelligence, vol. Pami-8, No. 4, Jul. 1986, 9 pages.

Orny, Camille et al,, "Characterization of maritime pine forest structure changes with VHR satellite imagery: application to the Jan. 24, 2009 windfall damages cartography", CNES Technical Report, Toulouse, Jan. 11, 2010, 60 pages.

Plaza, Javier et al., "On the use of small training sets for neural network-based characterization of mixed pixels in remotely sensed hyperspectral images", Pattern Recognition 42.11 Apr. 2009, 14 pages.

Weinman, Jerod J. et al., "Toward Integrated Scene Text Reading", IEEE Transactions on Pattern Analysis and Machine Intelligence 36.2, 2014, 14 pages.

Zhang, Yan et al., "Deep neural network for halftone image classification based on sparse auto-encoder", Engineering Applications of Artificial Intelligence 50, Feb. 2016, 11 pages.

* cited by examiner

AUTOMATIC SEGMENTATION OF DATA DERIVED FROM LEARNED FEATURES OF A PREDICTIVE STATISTICAL MODEL

BACKGROUND

The present application relates generally to an improved data processing apparatus and method and more specifically to mechanisms for automatic segmentation of data derived from learned features of a predictive statistical model.

Artificial neural networks computing systems vaguely inspired by the biological neural networks that constitute animal brains. Such systems "learn" (i.e., progressively improve performance on) tasks by considering examples, generally without task-specific programming. For example, in image recognition, they might learn to identify images that contain cats by analyzing example images that have been manually labeled as "cat" or "no cat" and using the results to identify cats in other images. Neural Networks do this without any a priori knowledge about cats, e.g., that they have fur, tails, whiskers, and cat-like faces. Instead, they evolve their own set of relevant characteristics from the learning material that they process.

A neural network is based on a collection of connected units or nodes called artificial neurons (a simplified version of biological neurons in an animal brain). Each connection (a simplified version of a synapse) between artificial neurons can transmit a signal from one to another. The artificial neuron that receives the signal can process it and then signal artificial neurons connected to it.

In common neural network implementations, the signal at a connection between artificial neurons are a real number, and the output of each artificial neuron is calculated by a non-linear function of the sum of its inputs. Artificial neurons and connections typically have a weight that adjusts as learning proceeds. The weight increases or decreases the strength of the signal at a connection. Artificial neurons may have a threshold such that only if the aggregate signal crosses that threshold is the signal sent. Typically, artificial neurons are organized in layers. Different layers may perform different kinds of transformations on their inputs. Signals travel from the first (input), to the last (output) layer, possibly after traversing the layers multiple times.

The original goal of the neural network approach was to solve problems in the same way that a human brain would. However, over time, attention focused on matching specific tasks, leading to deviations from biology. Neural networks have been used on a variety of tasks, including computer vision, speech recognition, machine translation, social network filtering, playing board and video games and medical diagnosis.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions executed by the processor to specifically configure the processor to implement a statistical model tool for providing insight into decision making. The method comprises applying, by the statistical model tool, the statistical model to an input image to generate an original classification probability. The method further comprises iteratively modifying, by an image modification component executing within the statistical model tool, each portion of the input image to generate a modified image; applying, by the statistical model tool, the statistical model to the modified image to generate a new classification probability for each portion of the input image; and comparing, by a compare component executing in the statistical model tool, each new classification probability to the original classification probability to generate a respective probability distance. The method further comprises generating, by a distance map generator executing within the statistical model tool, a distance map data structure based on the probability distances. The distance map data structure represents an impact each portion of the input image has on determining classification probability by the statistical model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Class Activation Maps (CAMs) produce heat maps from convolutional neural networks (CNNs) representing the areas in an image that had the most significant impact on the outcome of the decision. CAMs produce a visual representation of the areas of interest for a CNN; however, CAMs are not agnostic of the model and are specific to CNNs. The prior art does not provide an agnostic tool for trained statistical models broadly that provide insight into the decision making process.

The illustrative embodiments provide a mechanism for an agnostic analysis tool for neural networks and other trained statistical models. A given trained statistical model has an input x and the output of a function acting on x. The input x may be an image, text, audio, signal, etc. The mechanism of the illustrative embodiments creates a composition of data that is a representation of the prediction for a given input in which the input is evaluated a number of times equal to a number of portions of input data being modified. Iterating through each pixel of an image, for example, the mechanism of the illustrative embodiments modifies the pixel and calculates a new prediction using the aforementioned trained statistical model. The mechanism then creates a data representation where each byte or pixel is set to the difference between the original prediction and the new prediction. The mechanism stores the aggregate of these differences in a data structure referred to as a distance map.

The resulting data representation then illustrates the degree of impact that each pixel has on the prediction. Here impact is defined as the amount of change between the original prediction and the new prediction. The distance map is then used to create groupings where each group contains pixels having a similar impact on the prediction. If the input is an image, then the mechanism marks contours of the groupings on the image. These markings identify the regions of interest as determined by the statistical model.

The mechanism of the illustrative embodiments measures the distance (e.g., Euclidian distance, Chebyshev distance, Manhattan distance, etc.) of change of probability of classification of the output, given a single unit of data (e.g., pixel, byte) change in the input, for every unit of a dataset. The mechanism then creates a distance map of the result representing the intensities or heat of distances in the changes in the probabilities of the output for every pixel. From this distance map, the mechanism uses clustering (or a method to group values of similarity) of the distances to generate a map of groupings. The map of groupings gives insight into why a trained statistical model made a particular decision.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
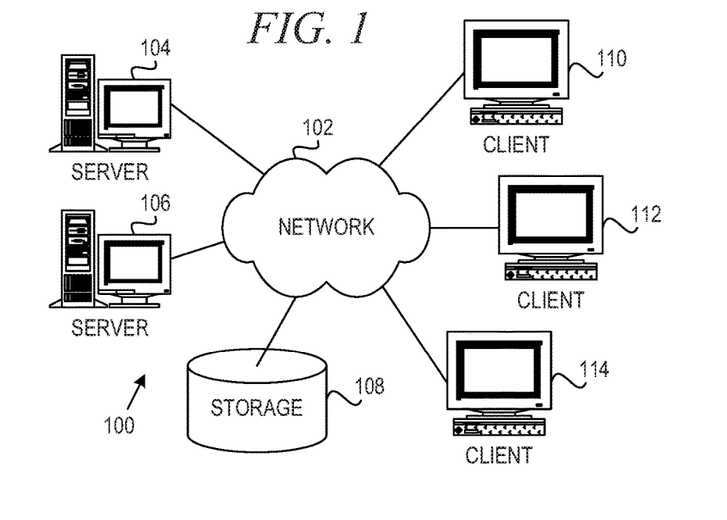
FIG. 1 is an example diagram of a distributed data processing system in which aspects of the illustrative embodiments may be implemented.
Figure 2:
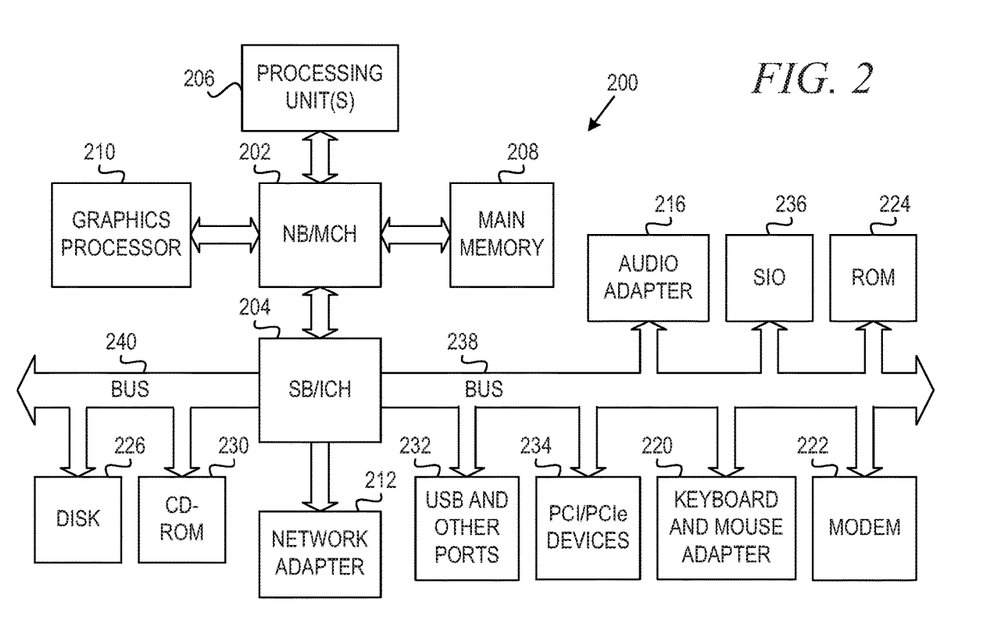
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in Which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an artificial neural network tool for providing insight into decision making. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates or implements an artificial neural network tool for providing insight into decision making.

As noted above, the mechanisms of the illustrative embodiments utilize specifically configured computing devices, or data processing systems, to perform the operations for an artificial neural network tool. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the artificial neural network tool for providing insight into decision making.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figures 3A, 3B:
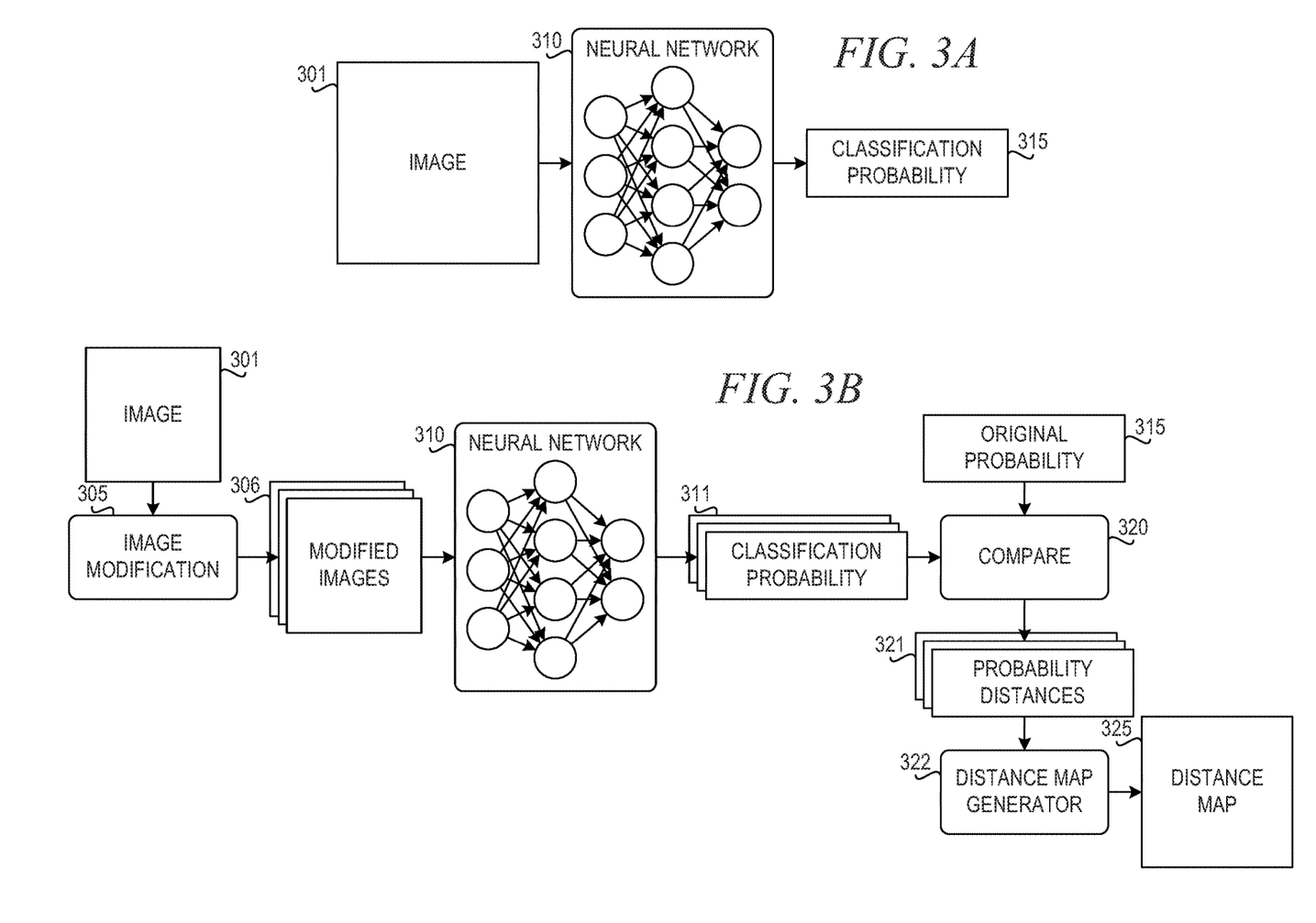
FIGS. 3A-3C are block diagrams illustrating an artificial neural network tool for providing insight into decision making in accordance with an illustrative embodiment.
Figure 3C:
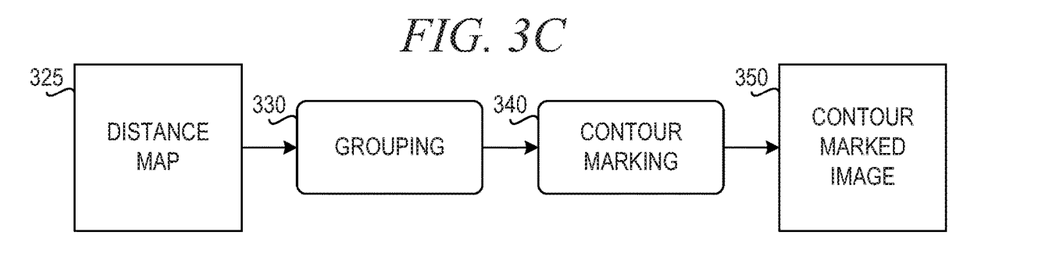

FIGS. 3A-3C are block diagrams illustrating an artificial neural network tool for providing insight into decision making in accordance with an illustrative embodiment. With reference to FIG. 3A, the artificial neural network tool processes image 301 using neural network 310 to generate a classification probability 315. In the depicted example, the input is image 301; however, the image may be a text string, an audio file, a signal, or the like depending upon the implementation. In the example embodiment, the trained statistical model is neural network 310; however, the trained statistical model may be another type of trained statistical model that performs a classification task that generates a probability or numerical value. For example, in an alternative embodiment, the trained statistical model may be a support vector machine (SVM) or a linear regression model. The trained statistical model may perform any number of classifications. In the depicted example, the trained statistical model performs classification of image 301. Classification probability 315 may represent the probability of the presence or non-presence of an item or object. For example, image 301 may be a medical image, and classification probability 315 may represent the probability that the medical image shows the presence of an abnormality, such as a tumor.

Turning to FIG. 3B, pixel modification component 306 modifies each portion of image 301 to form modified images 306. In one embodiment, image modification component 305 modifies each individual pixel by blacking out the pixel. For example, image modification component 305 may change the pixel value to a (0, 0, 0) given a set of (red, green, blue) pixel color values. The neural network tool may iteratively change every pixel to a black dot to see how much influence that pixel had on the categorization of image 301. It should be noted that while the illustrative embodiment uses a blacked out pixel value, any reference color, i.e., a set of pixel values, may be used depending upon the desired implementation. For example, for darker color pixels, image modification component 305 may white out the pixel. Other techniques may be used to modify pixel values, such as a gradient function, particle swarm optimization, simulated annealing, etc. The tool executes neural network 310 with modified images 306 as inputs to generate classification probabilities 311. In the depicted example, neural network 310 is a trained predictive or statistical model; however, other trained statistical models may be used depending upon the implementation.

Compare component 320 compares the classification probabilities 311 to the original classification probability to generate probability distances 321, which represent a difference between the classification probabilities 311 and the original probability 315. While compare component 320 may simply take the absolute value of the classification probabilities 311 minus the original probability 315, in other embodiments compare component 320 may determine the distance using other methods, such as Euclidean distance, Chebyshev distance, Manhattan distance, etc.). That is, each classification probability 311 may be a probability vector representing a plurality of classification probability outputs. In this case, probability distances 321 may represent the differences between the original probability vector 315 and each new probability vector 311.

Distance map generator 322 aggregates probability distances 321 and generates distance map 325, which is a data structure representing the impact of modifying each pixel in the image 301 on the resulting classification probability vector.

The tool may use a classification per input. For example, the tool may determine the reason why an image has a high probability or a low probability for cancer. The system then iterates through the entire image to modify each pixel and run the modified image through the neural network 310 each time and examines the differences in the probabilities of the output classification, i.e., the classification of normal, cancer, etc. At this point, the tool generates distance map 325, which shows the impact that each pixel has on the classification.

Turning to FIG. 3C, distance map 325 may be used to create groupings where each group contains pixels having a similar impact on the prediction. These groupings can provide evidence why the input data has a high or low probability. The tool may then highlight areas that are most influential on the classification. This can be more beneficial for highlighting areas of the image that are influential when the output is determined to be incorrect, and, thus, can be used to determine what is going on with the training data set to determine why the model is trained incorrectly, or to provide a reason to a clinician for the outcome of the classification. For example, a particular image may classify correctly but based on the wrong features.

Grouping component 330 performs clustering on the pixels of distance map 325. In one embodiment, grouping component 330 performs k-means clustering to group pixels having similar distance values. It should be noted that the method used for grouping in the depicted example is k-means clustering; however, any grouping algorithm may be used. The key component is that the distance map provides a basis of data that can be analyzed or manipulated in many different ways.

Contour marking component 340 generates contours that can be marked on the image 301 to form contour marked image 350. These markings identify the regions of interest as determined by the statistical model, i.e., neural network 310.

The artificial neural network tool of the illustrative embodiments may be used on image data where one does not have access to the underlying reasoning that was used to classify the image. The tool may be used to evaluate the operation of an algorithm to determine if they are classifying correctly based on the evidence specified in a map of the groupings. Moreover, the tool may be used to compare two algorithms and provide an independent way of analyzing the trained predictive model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
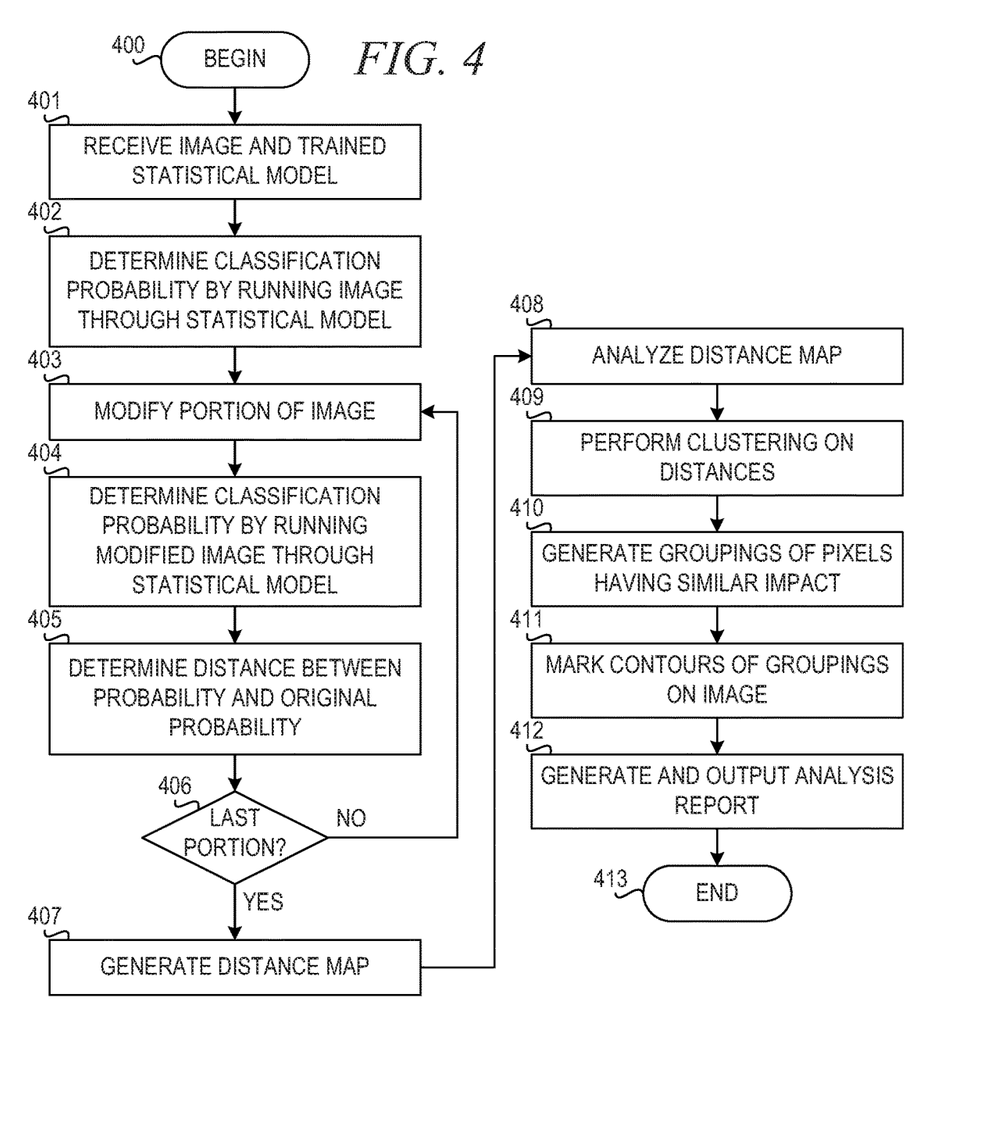
FIG. 4 is a flowchart illustrating operation of an artificial neural network tool for providing insight into decision making in accordance with an illustrative embodiment.

FIG. 4 is a flowchart illustrating operation of an artificial neural network tool for providing insight into decision making in accordance with an illustrative embodiment. Operation begins (block 400), and the artificial neural network tool receives an image and a trained statistical model (block 401). The tool determines a classification probability by running the image through the statistical model (block 402). The tool modifies a portion of the image (e.g., a pixel) (block 403) and determines a classification probability by running the modified image through the statistical model (block 404). The tool then determines a distance between the probability and the original probability from block 402 (block 405).

The tool determines whether the portion of the image is the last portion to be modified (block 406). If the portion is not the last portion, then operation returns to block 403 to modify the next portion of the image. If the portion is the last portion to be modified in block 406, then the tool aggregates the probability distances and generates a distance map (block 407).

Next, the tool analyzes the distance map (block 408) and performs clustering on the distances (block 409). The tool generates groupings of pixels having similar impact (block 410). The tool then marks contours of the groupings on the image (block 411). The tool may output the contour marked image to a user. The tool also generates and outputs an analysis report to the user (block 412). Thereafter, operation ends (block 413).

The tool may provide analysis reports based on analysis of the distance map. For example, if the regions of interest are not as expected, the analysis report may provide insight into the training images used to train the statistical model or neural network. The analysis report may assist in training the model and determining where training should be modified to improve the accuracy of the model's classification output.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for providing insight into decision making for a trained statistical model. The approach of the illustrative embodiments is agnostic of the statistical model used for the prediction. It does not require any modifications of, access to, or understanding of how the model works. The illustrative embodiments allow one to compare different models with respect to accuracy and loss. The illustrative embodiments provide insight on how a model arrives at a prediction by highlighting what the model has determined to be the regions of interest. Thus, one can modify the input, the training data, or the hyper parameters so as to increase the accuracy of the model. The illustrative embodiments provide the ability to justify the input format and/or the hyper parameters of the model.

The illustrative embodiments provide insights as to what portions of the input data are most influential in the output generated by a trained statistical model with regard to the classification made by the trained statistical model. This may assist in training the model and determining where training should be modified to improve the accuracy of the model's classification output.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions executed by the processor to specifically configure the processor to implement a statistical model tool for providing insight into decision making, the method comprising:
applying, by the statistical model tool, the statistical model to an input image to generate an original classification probability;
iteratively modifying, by an image modification component executing within the statistical model tool, each portion of the input image to generate a modified image; applying, by the statistical model tool, the statistical model to the modified image to generate a new classification probability for each portion of the input image; and comparing, by a compare component executing in the statistical model tool, each new classification probability to the original classification probability to generate a respective probability distance; and
generating, by a distance map generator executing within the statistical model tool, a distance map data structure based on the probability distances, wherein the distance map data structure represents an impact each portion of the input image has on determining classification probability by the statistical model.

2. The method of claim 1, further comprising:
performing, by a grouping component executing within the statistical model tool, a grouping operation on the probability distances to generate at least one group of portions of the image having similar probability distances;
marking, by a contour marking component executing within the statistical model tool, contours of the at least one group of portions of the image to form a contour marked image; and
outputting, by the contour marking component, the contour marked image to a user.

3. The method of claim 2, wherein the grouping operation comprises k-means clustering.

4. The method of claim 1, further comprising:
performing analysis on the distance map; and
generating and outputting an analysis report based on the analysis to a user.

5. The method of claim 1, Wherein the statistical model is a convolutional neural network.

6. The method of claim 1, wherein each portion of the image is a pixel of the image.

7. The method of claim 6, wherein modifying each portion of the input image comprises blacking out each portion of the image.

8. The method of claim 6, wherein modifying each portion of the input image comprises modifying each portion of the image using a gradient function.

9. The method of claim 6, wherein modifying each portion of the input image comprises selecting pixels using particle swarm optimization or simulated annealing.

10. The method of claim 1, wherein the original classification probability comprises an original classification probability vector, wherein each new classification probability comprises a new classification probability vector, and wherein comparing each new classification probability to the original classification probability comprises calculating for each new classification probability a Euclidean distance, a Chebyshev distance, or a Manhattan distance.

11. A computer program product comprising a computer readable storage medium having a computer readable program stored therein, wherein the computer readable program, when executed on a processor of a data processing system, causes the data processing system to implement a statistical model tool for providing insight into decision making, wherein the computer readable program causes the data processing system to:
apply, by the statistical model tool, the statistical model to an input image to generate an original classification probability;
iteratively modify, by an image modification component executing within the statistical model tool, each portion of the input image to generate a modified image; apply, by the statistical model tool, the statistical model to the modified image to generate a new classification probability for each portion of the input image; and compare, by a compare component executing in the statistical model tool, each new classification probability to the original classification probability to generate a respective probability distance; and
generate, by a distance map generator executing within the statistical model tool, a distance map data structure based on the probability distances, wherein the distance map data structure represents an impact each portion of the input image has on determining classification probability by the statistical model.

12. The computer program product of claim 11, wherein the computer readable program further causes the data processing system to:
perform, by a grouping component executing within the statistical model tool, a grouping operation on the probability distances to generate at least one group of portions of the image having similar probability distances;
mark, by a contour marking component executing within the statistical model tool, contours of the at least one group of portions of the image to form a contour marked image; and
output, by the contour marking component, the contour marked image to a user.

13. The computer program product of claim 12, wherein the grouping operation comprises k-means clustering.

14. The computer program product of claim 11, wherein the statistical model is a convolutional neural network.

15. The computer program product of claim 11, wherein each portion of the image is a pixel of the image.

16. The computer program product of claim 15, wherein modifying each portion of the input image comprises blacking out each portion of the image.

17. The computer program product of claim 15, wherein modifying each portion of the input image comprises modifying each portion of the image using a gradient function.

18. The computer program product of claim 15, wherein modifying each portion of the input image comprises selecting pixels using particle swarm optimization or simulated annealing.

19. The computer program product of claim 11, wherein the original classification probability comprises an original classification probability vector, wherein each new classification probability comprises a new classification probability vector, and wherein comparing each new classification probability to the original classification probability comprises calculating for each new classification probability a Euclidean distance, a Chebyshev distance, or a Manhattan distance.

20. An apparatus comprising:
   a processor; and
   a memory coupled to the processor, wherein the memory comprises instructions which, when executed by the processor, cause the processor to implement a statistical model tool for providing insight into decision making, wherein the instructions cause the processor to:
   apply, by the statistical model tool, the statistical model to an input image to generate an original classification probability;
   iteratively modify, by an image modification component executing within the statistical model tool, each portion of the input image to generate a modified image; apply, by the statistical model tool, the statistical model to the modified image to generate a new classification probability for each portion of the input image; and compare, by a compare component executing in the statistical model tool, each new classification probability to the original classification probability to generate a respective probability distance; and
   generate, by a distance map generator executing within the statistical model tool, a distance map data structure based on the probability distances, wherein the distance map data structure represents an impact each portion of the input image has on determining classification probability by the statistical model.

* * * * *